(12) United States Patent
Hayashi

(10) Patent No.: US 11,397,548 B2
(45) Date of Patent: Jul. 26, 2022

(54) INSPECTION SYSTEM, INSPECTION APPARATUS, AND METHOD FOR CONTROLLING THE INSPECTION APPARATUS

(71) Applicant: CANON KABUSHIKI KAISHA, Tokyo (JP)

(72) Inventor: Kimio Hayashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/345,527

(22) Filed: Jun. 11, 2021

(65) Prior Publication Data
US 2021/0397386 A1 Dec. 23, 2021

(30) Foreign Application Priority Data

Jun. 17, 2020 (JP) .............................. JP2020-104670

(51) Int. Cl.
| | |
|---|---|
| G06F 11/08 | (2006.01) |
| G06F 3/12 | (2006.01) |
| G06T 7/00 | (2017.01) |
| H04N 1/00 | (2006.01) |

(52) U.S. Cl.
CPC .......... *G06F 3/1208* (2013.01); *G06F 3/1256* (2013.01); *G06T 7/001* (2013.01); *H04N 1/00018* (2013.01); *H04N 1/00045* (2013.01); *H04N 1/00076* (2013.01); *H04N 1/00082* (2013.01); *G06T 2207/30144* (2013.01); *G06T 2207/30168* (2013.01)

(58) Field of Classification Search
CPC ..... G06F 3/1208; G06F 3/1256; G06T 7/001; G06T 7/0002; G06T 2207/30144; G06T 2207/30168
USPC ................................ 358/1.15, 1.13; 382/112
See application file for complete search history.

(56) References Cited

U.S. PATENT DOCUMENTS

| | | | |
|---|---|---|---|
| 2013/0250319 A1* | 9/2013 | Kaneko .................... | G06K 9/03 358/1.9 |
| 2014/0079293 A1* | 3/2014 | Kitai .................... | G06T 7/0008 382/112 |

FOREIGN PATENT DOCUMENTS

JP           6411684 B1    10/2018

* cited by examiner

*Primary Examiner* — Jamares Q Washington
(74) *Attorney, Agent, or Firm* — Canon U.S.A., Inc. IP Division

(57) ABSTRACT

An inspection apparatus that inspects the quality of a printed product printed by a print apparatus receives information indicating a reference image, from an information processing apparatus that transmits a print job to the print apparatus. The inspection apparatus acquires the reference image based on the information indicating the reference image. The inspection apparatus receives from the print apparatus a scanned image of the printed product printed based on the print job received from the information processing apparatus, and inspects the quality of the printed product based on a comparison between the received scanned image and the acquired reference image.

6 Claims, 10 Drawing Sheets

FIG.4

```xml
<?xml version="1.0" encoding="UTF-8"?>
<JDF ID="JD01" JobPartID="JobPartID01" Type="Combined"
  Types="LayoutPreparation Imposition Interpreting Rendering DigitalPrinting"
  Activation="Active" Status="Ready" Version="1.3" Category="DigitalPrinting"
  ICSVersions="IDP_L1-1.0 Base_L1-1.0 MaxVersion="1.3"
  xmlns="http://www.CIP4.org/JDFSchema_1_1"
  xmlns:cj="http://www.canon.com/ns/CanonJDF"
  JobID="JobID01" DescriptiveName="ProductAAA">           ← 401
  <ResourcePool>                                           ← 402
    <RunList Class="Parameter" ID="IDRL" Status="Available" PartIDKeys="Run">
      <RunList Run="0">
        <LayoutElement>
          <FileSpec MimeType="application/pdf" URL="cid:Sample" TotalPage="300" ResourceUsage="Normal Brochure"/>   ← 403
        </LayoutElement>
      </RunList>
    </RunList>
    <DigitalPrintingParams Class="Parameter" ID="IDDPP" Status="Available"
      Collate="SheetSetAndJob">
      <MediaRef rRef="MED_000"/>
    </DigitalPrintingParams>
    <Media ID="MED_000" Class="Consumable" Status="Available" Dimension="842 1191" DescriptiveName="Media"/>
    <Component ID="COM_000" Class="Quantity" ComponentType="Final Product" Status="Unavailable"/>
  </ResourcePool>
  <ResourceLinkpool>
    <ComponentLink Usage="Output" rRef="COM_000" Amount="100"/>    ← 404
  </ResourceLinkpool>
</JDF>
```

FIG.5

```xml
<?xml version="1.0" encoding="UTF-8"?>
```
500 ～ `<JobTicket>`
    `<PrinterName>color printer1</PrinterName>`

501 ～ `<JobID>ID01</JobID>`

502 ～ `<JobTypeID>ProductAAA</JobTypeID>`

503 ～ `<NumberOfCopies>100</NumberOfCopies>`

504 ～ `<NumberOfScan>5</NumberOfScan>`

505 ～ `<Collate>None</Collate>`

506 ～ `<sides>TwoSidedFlipY</Sides>`

507 ～ `<MediaSize>842 1191</MediaSize>`

`</JobTicket>`

FIG.6

| JobTypeID | Master Image | JobID |
|---|---|---|
| ProductAAA | aaa.bmp | ID001 |
| ProductBBB | bbb.bmp | ID002 |
| ProductCCC | ccc.bmp | ID003 |
| ProductDDD | ddd.bmp | ID004 |

600

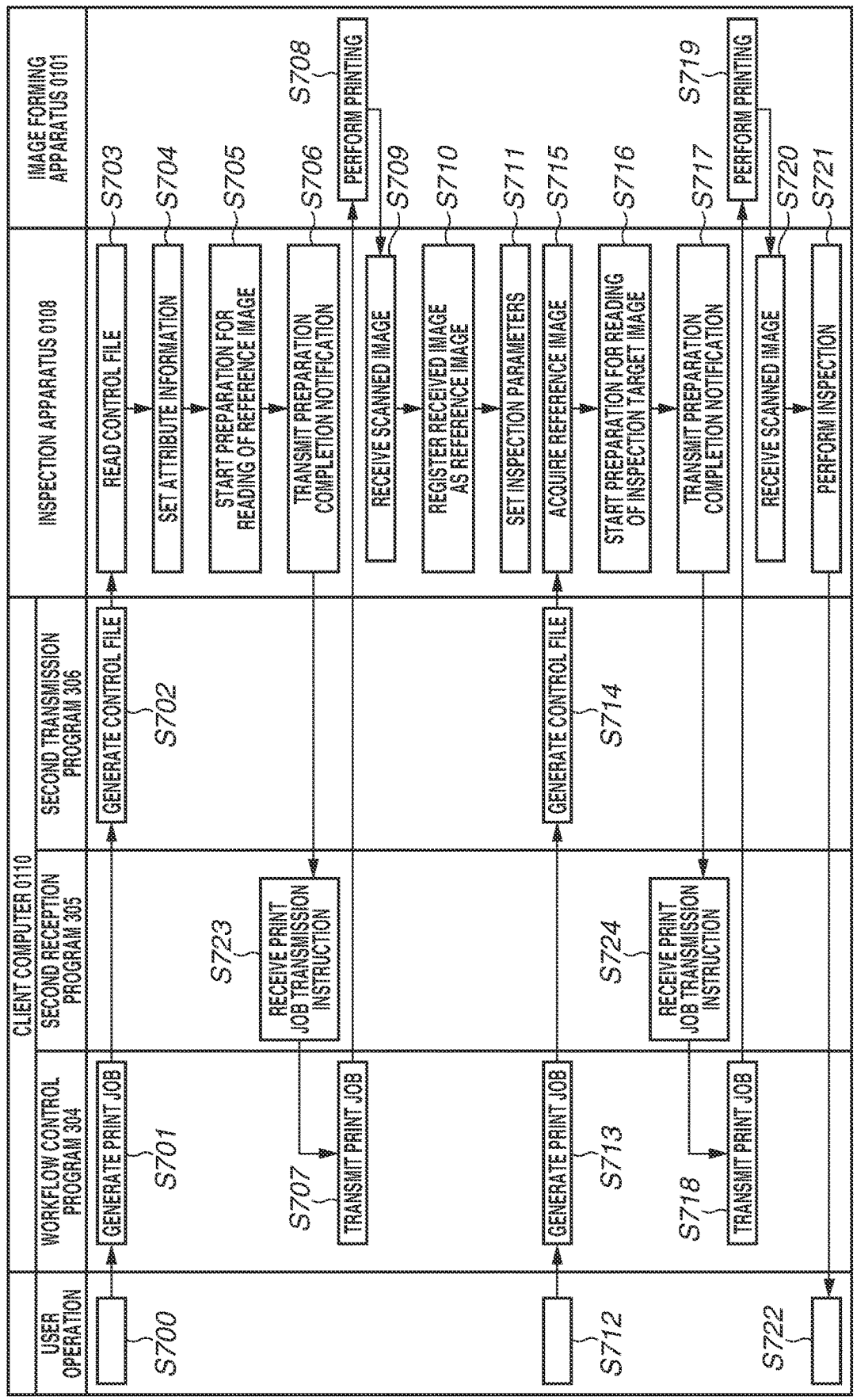

FIG.8A

Quality Inspection Settings — 800

- 801 — Job ID: ID001
- 802 — Job Type ID: ProductAAA
- 803 — Media Size: A3
  - Width: 842 mm
  - Height: 1191 mm
- 804 — Collate:
  - ○ On
  - ◉ Off
- 805 — Number of sheets: 300 sheets
- 806 — Number of copies: 100 copies

[ OK ] [ Cancel ]

FIG.8B

Quality Inspection Settings — 800

- 801 — Job ID: ID001
- 807 — Job Type ID: ProductAAA ▼
  - ProductBBB
  - ProductCCC
  - ProductDDD
- Height: 1191 mm
- 804 — Collate:
  - ○ On
  - ◉ Off
- 805 — Number of sheets: 300 sheets
- 806 — Number of copies: 100 copies

[ OK ] [ Cancel ]

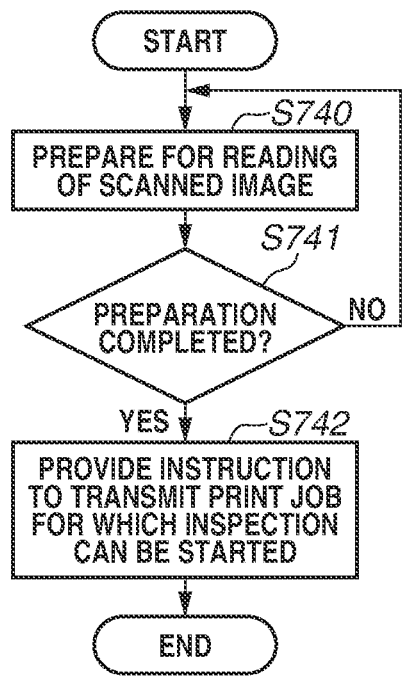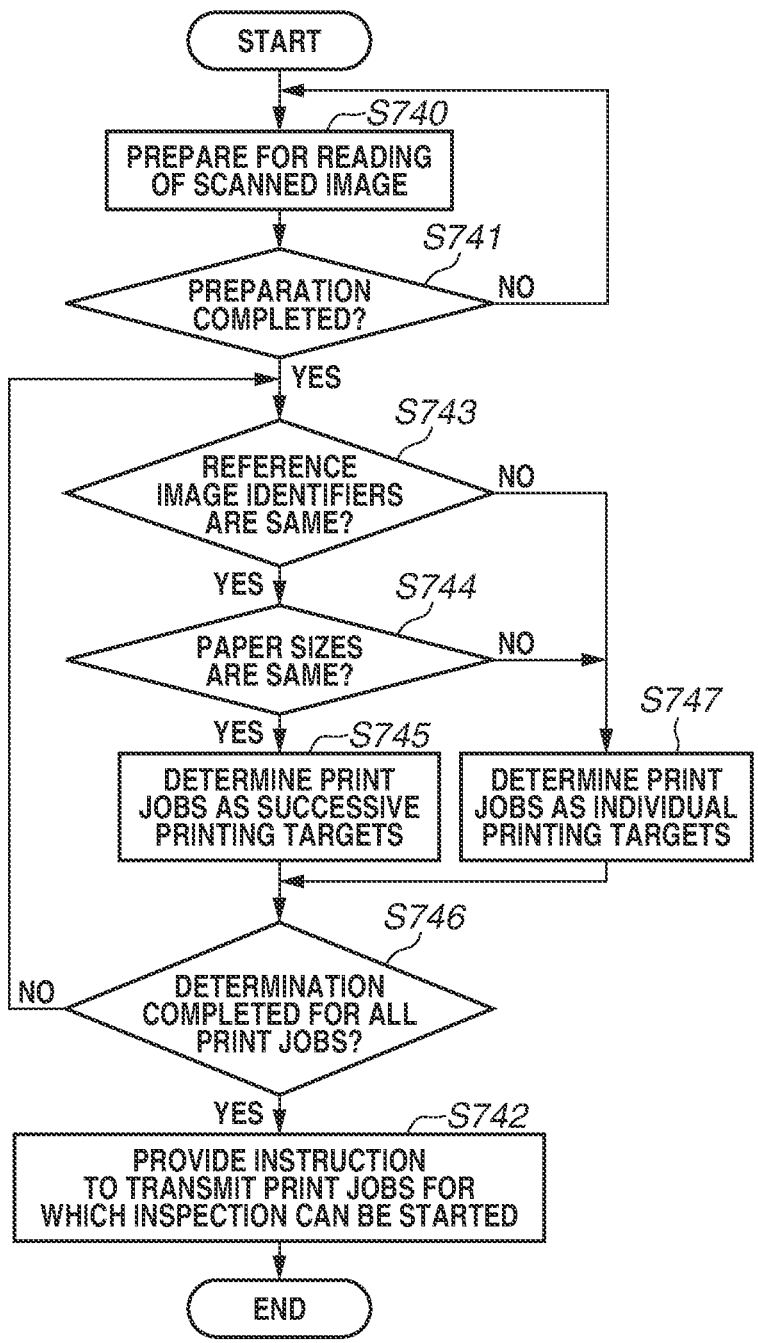

INSPECTION SYSTEM, INSPECTION APPARATUS, AND METHOD FOR CONTROLLING THE INSPECTION APPARATUS

BACKGROUND

Field of the Disclosure

The present disclosure relates to a technique for inspecting the print quality of printed products.

Description of the Related Art

There is known an inspection apparatus that reads a printed product printed by an image forming apparatus and inspects the quality of the printed product. The inspection apparatus can detect defects including image defects such as smudges and missing print, typographical errors, and low-quality bar codes. Printed products with the detected defects are separated from printed products with no defects by, for example, changing the discharge destination.

The inspection of printed products is divided into an inspection preparation phase and an inspection phase. In the inspection preparation phase, an image obtained by scanning a non-defective product is registered as a reference image in the inspection apparatus. In the inspection phase, an inspection target image obtained by scanning a target printed product is compared with the reference image, and an error in the printed product is detected based on a result of the comparison. To perform the image comparison, it is necessary to associate the printed product with the reference image.

Japanese Patent No. 6411684 discusses a technique for associating a printed product with a reference image, in which individual identification data is attached to each of printed products and reference images and inspection is performed by comparing the scanned image of the printed product and the reference image that have matching individual identification data.

However, to add individual identification data to a printed product, the printed product is required to have a margin area, and no individual identification data can be added to a printed product produced by borderless printing. Furthermore, no individual identification data can be added to the margin of a printed product in a case where a user who does not have a cutter uses the inspection apparatus. Therefore, there is an issue where the inspection cannot be performed in a case where information indicating the reference image cannot be added to the printed product.

SUMMARY

Embodiments of the present disclosure are directed to providing a technique for enabling inspection of a printed product by using a reference image corresponding to the printed product, even in a case where information indicating the reference image cannot be added to the printed product.

According to embodiments of the present disclosure, an inspection system includes a print apparatus, an inspection apparatus configured to inspect quality of a printed product printed by the print apparatus, and an information processing apparatus configured to transmit a print job to the print apparatus. The inspection apparatus includes a first reception unit configured to receive, from the information processing apparatus, information indicating a reference image, an acquisition unit configured to acquire the reference image based on the information indicating the reference image, a second reception unit configured to receive, from the print apparatus, a scanned image of the printed product printed by the print apparatus, and an inspection unit configured to inspect the quality of the printed product based on a comparison between the received scanned image and the acquired reference image. The print apparatus includes a printing unit configured to perform printing based on the print job received from the information processing apparatus.

Further features of the present disclosure will become apparent from the following description of exemplary embodiments with reference to the attached drawings.

BRIEF DESCRIPTION OF THE DRAWINGS

FIG. 4 is a diagram illustrating an example of a print job.

FIG. 5 is a diagram illustrating an example of a control file.

FIG. 6 is a diagram illustrating an example of information stored in a database that is used to associate a printed product with a reference image.

FIG. 7 is a flowchart illustrating entire processing performed by an inspection system.

FIGS. 8A and 8B are diagrams each illustrating an example of a setting screen.

FIGS. 10A and 10B are detailed flowcharts each illustrating step S717 of FIG. 7.

DESCRIPTION OF THE EMBODIMENTS

Exemplary embodiments of the present disclosure will be described below with reference to the drawings.

Figure 1:
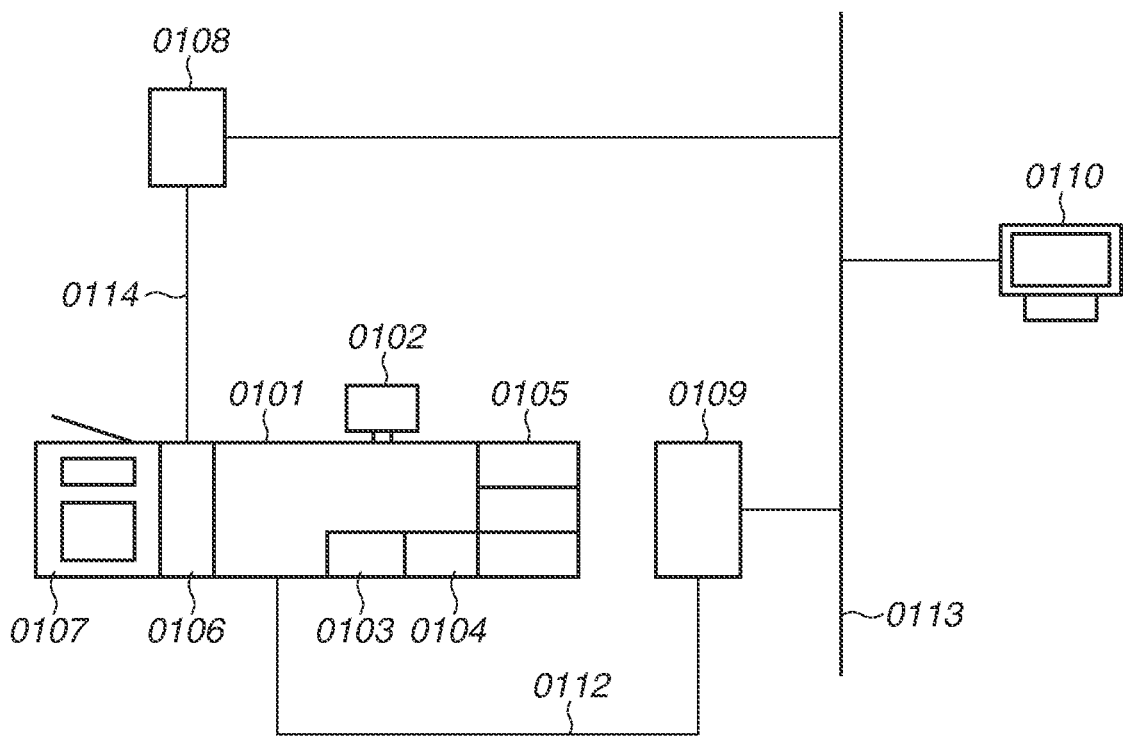
FIG. 1 is a schematic diagram illustrating a configuration of an inspection system including an information processing apparatus, an inspection apparatus, and an image forming apparatus.

FIG. 1 is a schematic diagram illustrating a configuration of an inspection system including an information processing apparatus, an inspection apparatus, and an image forming apparatus, which are according to a first exemplary embodiment of the present disclosure. The image forming apparatus according to the present exemplary embodiment will be described using an electrophotographic image forming apparatus as an example, but may be an image forming apparatus of other type such as an inkjet type or an offset type.

An image forming apparatus 0101 is connected to an information processing apparatus 0109 via a cable 0112. The information processing apparatus 0109 is connected to a client computer 0110 and an inspection apparatus 0108 via a network 0113.

The image forming apparatus 0101 includes a user interface (UI) panel 0102, a paper feed deck 0103, and a paper feed deck 0104. In addition, an optional deck 0105 including three-stage paper feed decks is connected to the image forming apparatus 0101. The image forming apparatus 0101 is, for example, an electrophotographic image forming apparatus. The UI panel 0102 is, for example, a user interface including a capacitance-type touch panel.

The image forming apparatus 0101 further includes an inspection unit 0106 and a large capacity stacker 0107. The inspection unit 0106 is connected to the inspection apparatus 0108 via a cable 0114. The large capacity stacker 0107 includes a main tray and a top tray, and several thousands of sheets can be stacked in the main tray at a time.

A print job is generated by the client computer 0110, is transmitted to the information processing apparatus 0109 via the network 0113, and is managed by the information processing apparatus 0109. The print job is then transmitted from the information processing apparatus 0109 to the image forming apparatus 0101 via the cable 0112, so that the image forming apparatus 0101 performs processing for printing on a sheet based on the print job. Alternatively, the print job may be generated and managed by the information processing apparatus 0109, and may be transmitted to the image forming apparatus 0101 via the cable 0112 and managed by the image forming apparatus 0101.

The client computer 0110, the information processing apparatus 0109, and the inspection apparatus 0108 may be connected to the cable 0112 to communicate with the image forming apparatus 0101. In other words, the configuration of connecting the image forming apparatus 0101, the information processing apparatus 0109, the client computer 0110, and the inspection apparatus 0108 described in the present exemplary embodiment is an example.

Figure 2:
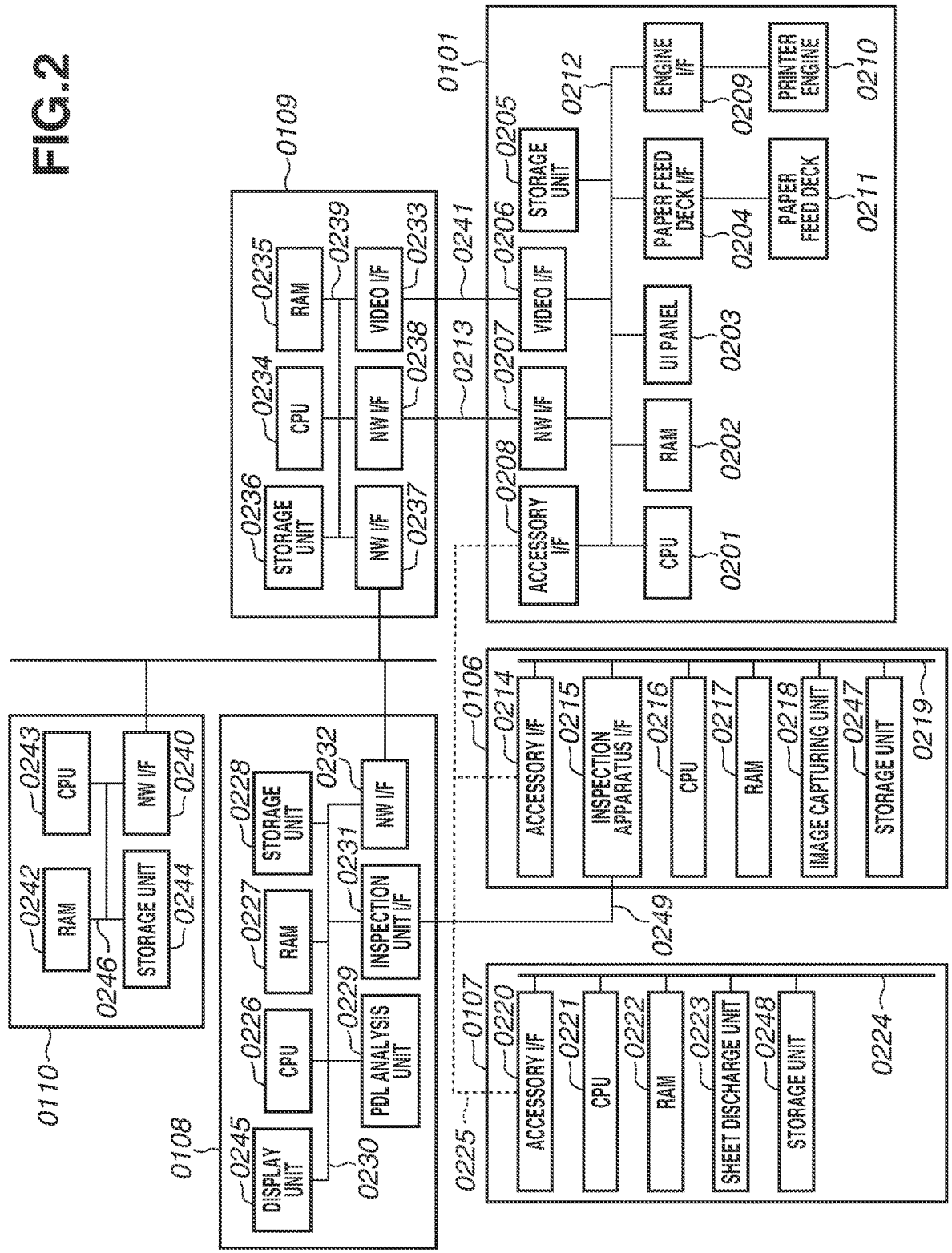
FIG. 2 is a block diagram illustrating the configuration of the inspection system including the information processing apparatus, the inspection apparatus, and the image forming apparatus.

FIG. 2 is a block diagram illustrating a control configuration of the inspection system including the image forming apparatus 0101, the inspection apparatus 0108, the inspection unit 0106, the large capacity stacker 0107, the information processing apparatus 0109, and the client computer 0110 according to the present exemplary embodiment.

A central processing unit (CPU) 0201 takes charge of control and calculation in each unit of the image forming apparatus 0101 via a system bus 0212. The CPU 0201 also takes charge of executing a program stored in a storage unit 0205 and loaded therefrom into a random access memory (RAM) 0202. The RAM 0202 is a kind of typical volatile memory that can be directly accessed by the CPU 0201, and is used as a work area of the CPU 0201 or a temporary data storage area. The storage unit 0205 functions as a temporary storage area and a work memory when the image forming apparatus 0101 operates.

An engine interface (I/F) 0209 is in charge of communication with and control of a printer engine 0210. A paper feed deck I/F 0204 is in charge of communication with and control of a paper feed deck 0211. The hardware configurations of the paper feed deck 0103, the paper feed deck 0104, and the optional deck 0105 are collectively referred to as the paper feed deck 0211. A UI panel 0203 is the hardware configuration of the UI panel 0102, and is a user interface for allowing the user to perform the operations of the image forming apparatus 0101. In the present exemplary embodiment, the UI panel 0203 includes the capacitance-type touch panel.

A network interface (NW I/F) 0207 is connected to a NW I/F 0238 of the information processing apparatus 0109 via a cable 0213, and is in charge of communication between the information processing apparatus 0109 and the image forming apparatus 0101. In this example, video IFs 0206 and 0233 connected to the system bus 0212 and a system bus 0239, respectively are directly connected to each other, but the information processing apparatus 0109 and the image forming apparatus 0101 may be connected, for example, using a network, and the connection method thereof is not specifically limited. The video I/F 0206 is connected to the video I/F 0233 via a video cable 0241, and is in charge of communication of image data between the information processing apparatus 0109 and the image forming apparatus 0101.

The connection interface with the image forming apparatus 0101 in the information processing apparatus 0109 may be such that the functions of the video I/F 0233 and the NW I/F 0238 are integrated. Furthermore, the connection interface with the information processing apparatus 0109 in the image forming apparatus 0101 may be such that the functions of the video I/F 0206 and the NW I/F 0207 are integrated.

An accessory I/F 0208 connects to an accessory I/F 0214 and an accessory I/F 0220 via a cable 0225. More specifically, the image forming apparatus 0101 communicates with the inspection unit 0106 and the large capacity stacker 0107 via the accessory I/Fs 0208, 0214, and 0220.

A CPU 0216 takes charge of control and calculation in each unit of the inspection unit 0106 via a system bus 0219. The CPU 0216 also takes charge of executing a program stored in a storage unit 0247 and loaded therefrom into a RAM 0217. The RAM 0217 is a kind of typical volatile memory that can be directly accessed by the CPU 0216, and is used as a work area of the CPU 0216 or a temporary data storage area. The storage unit 0247 functions as a temporary storage area and a work memory when the inspection unit 0106 operates. An inspection apparatus I/F 0215 is connected to an inspection unit I/F 0231 via a cable 0249. More specifically, the inspection unit 0106 communicates with the inspection apparatus 0108 via the inspection apparatus I/F 0215 and the inspection unit I/F 0231.

An image capturing unit 0218 has an image capturing function using a conduct image sensor (hereinafter referred to as a CIS). The image capturing unit 0218 captures an image of a sheet passing through the inspection unit 0106 and transmits the captured image to the inspection apparatus 0108 via the inspection apparatus I/F 0215. The CIS is an example of a sensor for the image capturing unit 0218, and other type of sensor such as a charge coupled device (CCD) image sensor may be used. The image capturing method thereof is not specifically limited.

A CPU 0221 takes charge of control and calculation in each unit of the large capacity stacker 0107 via a system bus 0224. The CPU 0221 also takes charge of executing a program stored in a storage unit 0248 and loaded therefrom into a RAM 0222. The RAM 0222 is a kind of typical volatile memory that can be directly accessed by the CPU 0221, and is used as a work area of the CPU 0221 or a temporary data storage area. The storage unit 0248 functions as a temporary storage area and a work memory when the large capacity stacker 0107 operates. A sheet discharge unit 0223 is in charge of operation for discharging sheets to the main tray and the top tray, and is also in charge of monitoring and control of the stacking status of each of the main tray and the top tray.

A CPU 0226 takes charge of control and calculation in each unit of the inspection apparatus 0108 via a system bus 0230. The CPU 0226 also takes charge of executing a program stored in a storage unit 0228 and loaded therefrom into a RAM 0227. The RAM 0227 is a kind of typical volatile memory that can be directly accessed by the CPU 0226, and is used as a work area of the CPU 0226 or a temporary data storage area. The storage unit 0228 functions as a temporary storage area and a work memory when the inspection apparatus 0108 operates. A page description language (PDL) analysis unit 0229 reads PDL data such as Portable Document Format (PDF), PostScript, or Printer Control Language (PCL) data received from the client computer 0110 or the information processing apparatus 0109, and performs interpretation processing. A display unit 0245 is, for example, a liquid crystal display connected to the inspection apparatus 0108, and receives an input to the inspection apparatus 0108 from the user and displays the status of the inspection apparatus 0108.

A CPU 0234 takes charge of control and calculation in each unit of the information processing apparatus 0109 via the system bus 0239. The CPU 0234 also takes charge of executing a program stored in a storage unit 0236 and loaded therefrom into a RAM 0235. The RAM 0235 is a kind of typical volatile memory that can be directly accessed by the CPU 0234, and is used as a work area of the CPU 0234 or a temporary data storage area. The storage unit 0236 functions as a temporary storage area and a work memory when the information processing apparatus 0109 operates. A NW I/F 0237 is connected to a NW I/F 0232 and a NW I/F 0240 via a network. The information processing apparatus 0109 communicates with the inspection apparatus 0108 via the NW I/F 0237 and the NW I/F 0232. The information processing apparatus 0109 also communicates with the client computer 0110 via the NW I/F 0237 and the NW I/F 0240.

A CPU 0243 takes charge of control and calculation in each unit of the client computer 0110 via a system bus 0246. The CPU 0243 also takes charge of executing a program stored in a storage unit 0244 and loaded therefrom into a RAM 0242. The RAM 0242 is a kind of typical volatile memory that can be directly accessed by the CPU 0243, and is used as a work area of the CPU 0243 or a temporary data storage area. The storage unit 0244 functions as a temporary storage area and a work memory when the client computer 0110 operates.

Figure 3:
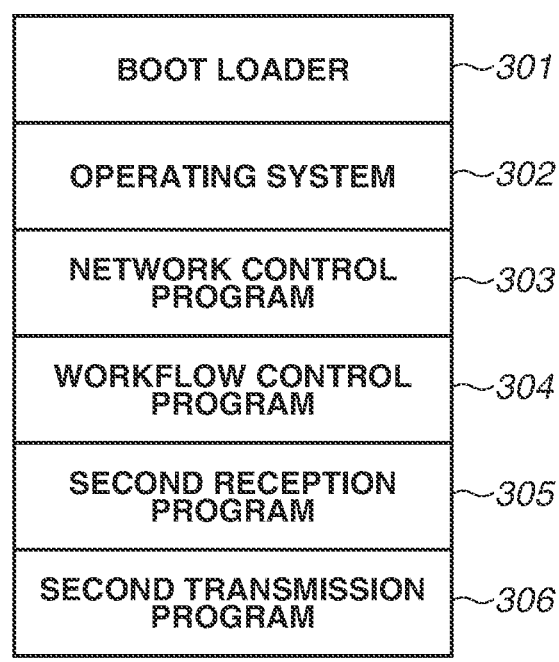
FIG. 3 is a diagram illustrating an example of a program configuration of a client computer.

FIG. 3 is a diagram illustrating an example of a program configuration of the client computer 0110.

A boot loader 301 is a program to be executed immediately after the client computer 0110 is powered on. The boot loader 301 includes a program for executing various startup sequences for starting up the system.

An operating system 302 is a program for providing an environment for executing various programs that implement the functions of the client computer 0110. The operating system 302 provides functions including a function for managing the memory of the client computer 0110, i.e., resources such as the RAM 0242 and the storage unit 0244.

A network control program 303 is a program to be executed when data is transmitted to and received from an apparatus connected via a network. More specifically, the network control program 303 is used when a print job is transmitted to the image forming apparatus 0101 to perform print processing. The network control program 303 is also used when a control file is transmitted to the inspection apparatus 0108. Furthermore, the network control program 303 is used when a print job transmission instruction is received from the inspection apparatus 0108.

A workflow control program 304 is a program for performing centralized management of generation of a print job, transmission of a print job, generation of a control file, and the like, and forms the core of the client computer 0110.

A second reception program 305 is a program for receiving a print job transmission instruction from the inspection apparatus 0108. When receiving the print job transmission instruction from the inspection apparatus 0108, the second reception program 305 notifies the workflow control program 304 of the received instruction, conditions, and the like.

A second transmission program 306 is a program for transmitting a control file to the inspection apparatus 0108. The second transmission program 306 generates a control file using the information of a print job before transmission of the print job, and transmits the generated control file to the inspection apparatus 0108.

FIG. 4 illustrates an example of the print job generated by the client computer 0110. In the present exemplary embodiment, Job Definition Format (JDF) that is a standard format is used as a print job format. The main parts of information included in the print job are a job identification (ID) 401, a print job name 402, resource information 403 indicating for what purpose the PDF data is used, and a copy count 404 of the print job. The job ID 401 is intended to uniquely identify the print job.

FIG. 5 illustrates an example of the control file generated by the client computer 0110 and transmitted to the inspection apparatus 0108. The control file represents an outline of the print job and is used to transmit the information of the print job to an apparatus such as the inspection apparatus 0108. In the present exemplary embodiment, the control file is generated in eXtensible Markup Language (XML) format, but may be generated in a format such as JavaScript Object Notation (JSON) format.

A line 500 represents a root element of the control file and corresponds to one print job. A line 501 represents a job ID and contains the same value as that of the job ID 401 of the print job illustrated in FIG. 4. A line 502 represents a reference image identifier that is used by the inspection apparatus 0108 to identify the reference image. The value of the reference image identifier can be mapped from the print job name 402 or the resource information 403. Alternatively, it is possible to input the same value as a value input for a job type ID 802 representing the reference image identifier on a setting screen 800 illustrated in FIG. 8A, at the time of reference image registration in an inspection preparation phase. In the present exemplary embodiment, the second transmission program 306 maps the value of the print job name 402 to the line 502 representing the reference image identifier.

A line 503 represents the number of copies of the print job. The number of copies of the print job means how many times printing of the same original is repeated for one print queue. For example, if the number of pages is ten, how many copies of (how many times) the ten pages are to be printed is specified. The number of copies of the print job is used to determine how many times inspection is to be performed in an inspection phase. If a less value is input in the line 503 representing the number of copies of the print job in the control file, a printed product supposed to be inspected is not to be inspected. Thus, the number of copies of the print job in the line 503 of the control file is the same value as the copy count 404 specified in the print job.

A line 504 represents the number of scans of a printed product to be used in the reference image registration. How many times a non-defective product is scanned to generate the reference image is specified as the number of scans. In the present exemplary embodiment, images obtained by scanning a non-defective product a plurality of times are combined together to generate the reference image. The reference image obtained by combining the images increases the inspection accuracy because there is less noise in the reference image. In contrast, if the number of scans of a non-defective product is small, the noise in the reference image is conspicuous, and thus the inspection accuracy decreases.

A line 505 represents the presence/absence of collate setting in the print job. In a case where a plurality of copies is to be printed with the collate setting, the print processing proceeds in the order of the first page, the first page, and the first page, instead of proceeding in the order of the first page, the second page, and the third page. Thus, the presence/absence of the collate setting is used to determine whether to perform inspection in the order of the first page, the first page, and the first page.

A line 506 represents two-sided setting of the print job, and is used to determine whether the back side of the printed product is to be an inspection target, in addition to the front side of the printed product.

A line 507 represents a paper size specified in the print job.

FIG. 6 illustrates an example of information stored in a database 600 that is used to associate a printed product with a reference image. The database 600 is in the storage unit 0228 of the inspection apparatus 0108. When the NW I/F 0232 of the inspection apparatus 0108 receives the control file from the NW I/F 0240 of the client computer 0110, the CPU 0226 analyzes the control file and acquires the value of the reference image identifier from the line 502 of the control file. The CPU 0226 refers to the database 600, and if the same value as the value of the reference image identifier in the line 502 is present therein, the CPU 0226 associates the print job indicated by the control file with the registered reference image. While the case where one reference image corresponding to the print job is registered in the database 600 has been described as an example, similar processing is performed also in a case where a plurality of reference images corresponding to the print job is registered in the database 600.

Characteristic processing according to the present exemplary embodiment will be described next with reference to a flowchart. A program of the image forming apparatus 0101 related to the flowchart is stored in the storage unit 0205 of the image forming apparatus 0101, and is loaded into the RAM 0202 and executed by the CPU 0201. A program of the inspection apparatus 0108 related to the flowchart is stored in the storage unit 0228 of the inspection apparatus 0108, and is loaded into the RAM 0227 and executed by the CPU 0226. A program of the information processing apparatus 0109 related to the flowchart is stored in the storage unit 0236 of the information processing apparatus 0109, and is loaded into the RAM 0235 and executed by the CPU 0234. A program of the client computer 0110 related to the flowchart is stored in the storage unit 0244 of the client computer 0110, and is loaded into the RAM 0242 and executed by the CPU0 243.

FIG. 7 is a system flowchart that is used when the client computer 0110, the inspection apparatus 0108, the image forming apparatus 0101, and the user who is an operator of these apparatuses use the functions provided by the system. In a case where a plurality of subsystems in each of the apparatuses cooperatively performs processing, the flowchart will be described at the level of the subsystems.

In FIG. 7, a column representing user operations in steps S700, S711, and S720 indicates the contents of instruction operations performed by the user on a screen provided by the client computer 0110 in order to implement a series of processing illustrated in FIG. 7, and also indicates a relationship with processing that occurs as a result of each of the operations.

In step S700, the user instructs the client computer 0110 to perform reference image registration. For example, the user performs an operation of pressing a test print button. More specifically, in response to the instruction operation in step S700, the workflow control program 304 and the second transmission program 306 perform various kinds of processing for the reference image registration. In step S701, the workflow control program 304 generates a print job.

In step S702, the second transmission program 306 generates a control file based on the settings of the print job, and transmits the generated control file to the inspection apparatus 0108. The control file may be transmitted using Hypertext Transfer Protocol (HTTP) communication, or may be placed in a folder that can be accessed by the client computer 0110 and the inspection apparatus 0108. In the present exemplary embodiment, the description will be given using the method of placing the control file in the folder.

In step S703, the CPU 0226 reads the control file generated in step S702. In step S704, the CPU 0226 analyses the control file, and sets attribute information of the reference image. For example, the CPU 0226 automatically reflects the values specified in the control file, in the items of the setting screen 800 illustrated in FIG. 8A. When the attribute information of the reference image is to be set, job information indicating for what printed product the reference image is to be registered is specified. For example, in a case where the job information is specified by the user, the CPU 0226 displays the setting screen 800 illustrated in FIG. 8A, and prompts the user to input an value for the job type ID 802 representing the reference image identifier. The value to be input for the job type ID 802 may be any value as long as the printed product to be inspected can be identified from the value. In a case where the printed product to be inspected has already been known, the CPU 0226 can prompt the user to select a desired one from a drop-down list for a job type ID 807, as illustrated in FIG. 8B. In a case where the CPU 0226 has already been notified of the control file by the client computer 0110, the CPU 0226 may display a file selection screen (not illustrated) to prompt the user to select the control file to be associated with the reference image, and may use the reference image identifier in the line 502 of the selected control file. Depending on the attribute of the reference image, information other than the reference image identifier may be set. In the present exemplary embodiment, information regarding a job ID 801, a media size 803, a collate 804, the number of sheets 805, the number of copies 806, and the like is set.

In step S705, the CPU 0226 starts preparation for reading the reference image. At this time, the inspection unit I/F 0231 notifies the inspection apparatus I/F 0215 of the start of the preparation for reading the reference image. In response to the notification, the CPU 0216 instructs the image capturing unit 0218 to prepare for reading the reference image, and upon completion of the preparation, the CPU 0216 notifies the CPU 0226 of the completion via the inspection apparatus I/F 0215 and the inspection unit I/F 0231. In step S706, the CPU 0226 transmits a notification of completion of preparation for the reference image registration, and becomes ready to receive the scanned image of the printed product. In step S723, upon receiving the notification of the completion of the preparation for the reference image registration, the second reception program 305 determines that the print job can be transmitted and then transmits, to the workflow control program 304, an instruction to transmit the print job. Subsequently, in step S707, the workflow control program 304 transmits the print job to the image forming apparatus 0101 via the information processing apparatus 0109. When the notification of the completion of the preparation for the reference image registration is transmitted in step S706, information about the number of scans is also transmitted. In step S707, the received information about the number of scans is set as the number of copies of the print job to be transmitted, and then the print job is transmitted to the image forming apparatus 0101. More specifically, the print job transmitted in step S707 includes the information about the number of scans received from the inspection apparatus 0108, as the number of copies of the job.

In step S708, the CPU 0201 prints an image based on the PDF data included in the print job. Then, the inspection unit 0106 scans the printed image when a sheet having the printed image passes on the sheet conveyance path. In step S709, the CPU 0226 receives the scanned image from the inspection unit 0106 via the inspection apparatus I/F 0215 and the inspection unit I/F 0231. In step S710, the CPU 0226 registers the image received in step S709 in the RAM 0227 as the reference image. At this time, a plurality of reference images may be read to prompt the user to select a desired one, or may be combined together, or may be registered.

In step S711, the CPU 0226 displays an inspection parameter setting screen (not illustrated) on the display unit 0245. When the display unit 0245 receives a "completion" instruction on the inspection parameter setting screen, the flowchart for the reference image registration ends.

As described above, the reference image obtained by scanning a non-defective product is registered in the inspection apparatus 0108, and the reference image and the printed product serving as the printing/inspection target are associated with each other.

After the reference image registration, in step S712, the user instructs the client computer 0110 to perform inspection. For example, the user performs an operation of pressing a print button. More specifically, in response to the instruction operation in step S712, the workflow control program 304 and the second transmission program 306 perform various kinds of processing for performing the inspection.

In step S713, the workflow control program 304 generates a print job. In step S714, the second transmission program 306 generates the control file illustrated in FIG. 5, based on the settings of the generated print job, and transmits the generated control file to the inspection apparatus 0108. In step S715, the CPU 0226 acquires the reference image corresponding to the print job, using the information described in the control file. The details of step S715 will be described below with reference to FIG. 9.

In step S716, the CPU 0226 starts preparation for inspecting the print job that has been associated with the reference image, and starts preparation for reading the inspection target image. In step S717, the CPU 0226 transmits a notification of completion of the preparation for the inspection, and becomes ready to receive the scanned image of the printed product. In step S724, the second reception program 305 receives, from the inspection apparatus 0108, information indicating the state of readiness to receive the scanned image, i.e., the notification of the completion of the preparation for the inspection. In step S724, upon receiving the notification of the completion of the preparation for the inspection, the second reception program 305 determines that the print job can be transmitted and then transmits, to the workflow control program 304, an instruction to transmit the print job. Subsequently, in step S718, the workflow control program 304 transmits the print job to the image forming apparatus 0101 via the information processing apparatus 0109.

In step S719, the image forming apparatus 0101 prints an image based on the PDF data included in the print job, and scans the printed image when a sheet having the printed image passes on the sheet conveyance path. In step S720, the CPU 0226 receives the scanned image, which is the inspection target image, from the inspection unit 0106 via the inspection apparatus I/F 0215 and the inspection unit I/F 0231. In step S721, the CPU 0226 reads, from the storage unit 0228, the reference image associated with the print job in step S710, and compares the reference image with the inspection target image received from the inspection unit 0106. If the inspection result is OK based on the comparison, the printed product is output to the main tray of the sheet discharge unit 0223 of the large capacity stacker 0107. If the inspection result is not OK, the printed product is output to the top tray of the sheet discharge unit 0223. In step S722, the CPU 0226 notifies the user of the inspection result obtained by the comparison. The notification method is not specifically limited. The inspection result may be displayed on the display unit 0245 of the inspection apparatus 0108, or the client computer 0110 may be notified of the inspection result.

Upon completion of the inspection for all the inspection target images, the flowchart for the inspection ends.

While in the present exemplary embodiment, the processing performed when the number of inspection target images is one has been described, a plurality of inspection target images can be successively inspected using the processing according to the present exemplary embodiment.

Figure 9:
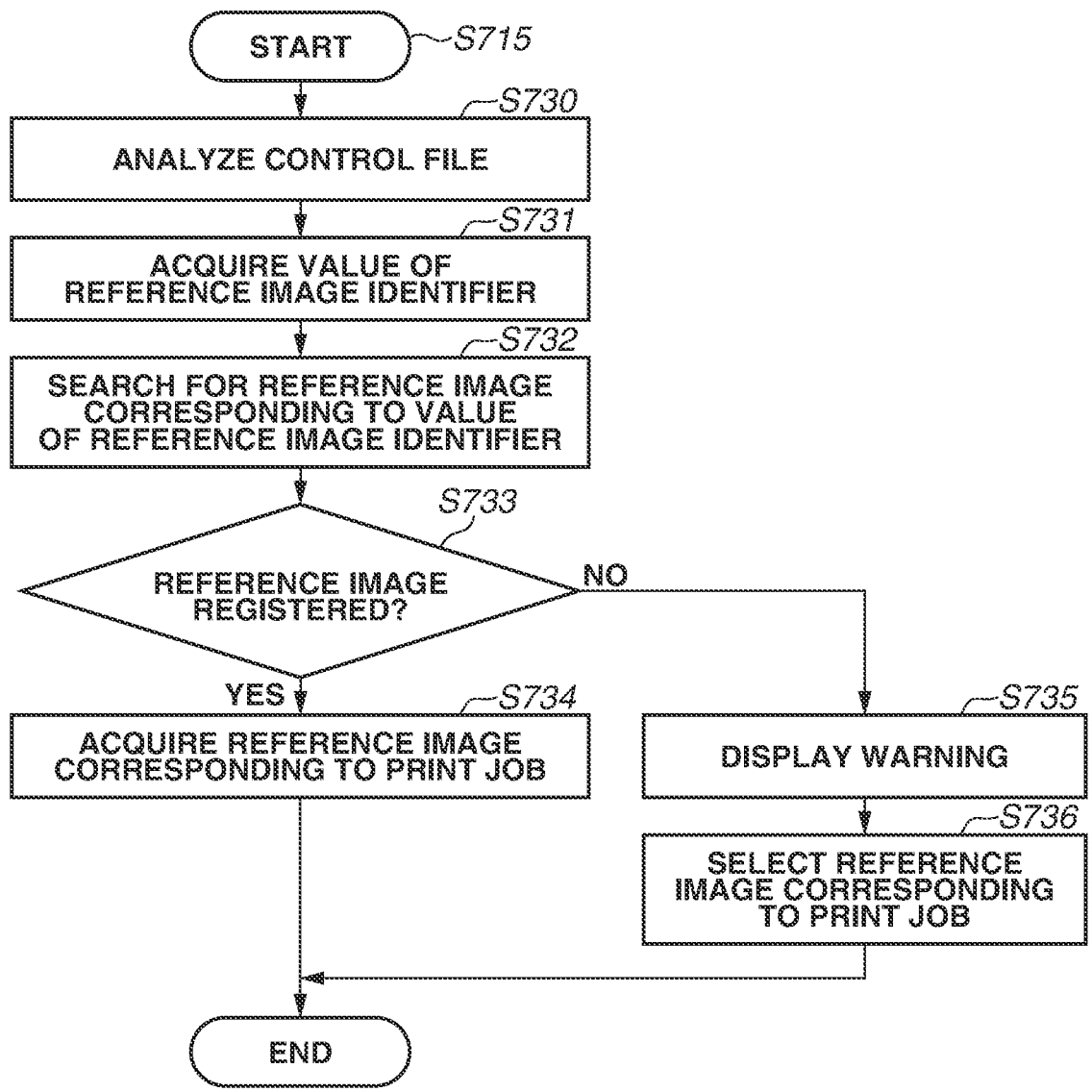
FIG. 9 is a detailed flowchart illustrating step S715 of FIG. 7.

FIG. 9 is a flowchart illustrating processing for acquiring the reference image corresponding to the print job in step S715.

In step S730, upon receipt of the control file from the client computer 0110, the CPU 0226 analyzes the control file. In step S731, the CPU 0226 acquires the value of the reference image identifier from the line 502 of the control file. In step S732, the CPU 0226 searches the database 600 for the reference image corresponding to the value of the reference image identifier acquired from the line 502.

In step S733, the CPU 0226 determines whether the reference image corresponding to the value of the reference image identifier is registered, i.e., whether the reference image corresponding to the print job is registered. If the reference image corresponding to the print job is registered (YES in step S733), the processing proceeds to step S734. If the reference image corresponding to the print job is not registered (NO in step S733), the processing proceeds to step S735. In step S734, the CPU 0226 acquires the reference image corresponding to the print job, and the processing proceeds to step S716. In step S735, the CPU 0226 displays a warning message (not illustrated) on the display unit 0245 to prompt the user to input a value for the job type ID 802 representing the reference image identifier on the setting screen 800, for example. The processing is interrupted with an error until the warning message is cleared. In step S736, the CPU 0226 displays the reference images that have been already registered, and prompts the user to select a desired one from among the reference images. In a case where the reference image corresponding to the value of the reference image identifier is not registered, but a registered reference image is to be used, the user is prompted to select the reference image to be used, and the selected image is set as the reference image corresponding to the print job.

According to the present exemplary embodiment, during the inspection, the printed product to be produced based on the print job and the reference image are associated with each other based on the value described in the control file, so that the reference image can be automatically identified even in a case where individual identification data cannot be added to the printed product, thereby enhancing the efficiency of inspection work.

While in the present exemplary embodiment, the example in which the reference image is generated by combining images obtained by scanning a non-defective product a plurality of times has been described, an image obtained by scanning a non-defective product once may be used as the reference image.

In a second exemplary embodiment, an example in which the inspection apparatus 0108 instructs the client computer 0110 to transmit the print job will be described with reference to FIG. 10A. The description of a part common to the first and second exemplary embodiments will be omitted.

FIG. 10A is a flowchart illustrating the details of the processing in step S717 of FIG. 7 according to the present exemplary embodiment.

In step S740, the CPU 0226 performs preparation for reading the scanned image of the printed product. In FIG. 7, step S716 corresponds to the processing in step S740.

In step S741, the CPU 0226 determines whether the preparation for reading the scanned image is completed. If the preparation is completed (YES in step S741), the CPU 0226 becomes ready to receive the scanned image of the printed product, and the processing proceeds to step S742. If the preparation is not completed (NO in step S741), the processing returns to step S740 and the CPU 0226 continues the preparation for reading the scanned image.

In step S742, the CPU 0226 issues, to the second reception program 305 of the client computer 0110, an instruction to transmit the print job for which the inspection can be started. More specifically, similarly to the method for transmitting the control file, the instruction may be issued using the HTTP communication, or the CPU 0226 may delete the control file, which is placed in a shared folder by the client computer 0110, to notify the second reception program 305 of the deletion event. In the present exemplary embodiment, the CPU 0226 deletes the control file from the shared folder, thereby notifying the second reception program 305 that the preparation for the inspection is completed.

In step S724 in FIG. 7, the second reception program 305 acquires the deletion event of the control file placed in the folder, thereby determining that the print job corresponding to the control file can be transmitted. Subsequently, the second reception program 305 transmits the instruction to transmit the print job, to the workflow control program 304.

In step S718, the workflow control program 304 transmits the print job based on the determination made in step S724.

As described above, the client computer 0110 according to the present exemplary embodiment can transmit the print job when it is certain that the inspection of the printed product to be produced based on the print job can be performed.

In the second exemplary embodiment, the example has been described in which the inspection apparatus 0108 instructs the client computer 0110 to transmit the print job for which the inspection can be started. Meanwhile, to perform the inspection without reducing the productivity of the image forming apparatus 0101, it is desirable to consider the control of two-sided circulation. For example, in a case where an instruction to transmit the next print job is issued after the completion of the immediately preceding print job, the two-sided circulation is interrupted, which leads to a reduction in the productivity of the image forming apparatus 0101. To solve this, in a third exemplary embodiment, an example of issuing the print job transmission instruction in consideration of the two-sided circulation will be described.

In step S712, the user issues an instruction to inspect a plurality of print jobs.

In step S713, the workflow control program 304 generates a plurality of print jobs based on the instruction from the user. In step S714, the second transmission program 306 generates the control file corresponding to the plurality of print jobs, and transmits the generated control file to the inspection apparatus 0108.

FIG. 10B is a flowchart illustrating the details of the processing in step S717 of FIG. 7 in the present exemplary embodiment.

In step S743, the CPU 0226 compares the respective reference image identifiers of the plurality of print jobs for which the inspection is determined to be possible in step S741, and determines whether the respective reference image identifiers are the same (i.e., the respective patterns are the same). If the reference image identifiers are the same (YES in step S743), the processing proceeds to step S744. If the reference image identifiers are different (NO in step S743), the processing proceeds to step S747.

In step S744, the CPU 0226 compares the paper sizes of the print jobs and determines whether the paper sizes of the printed products to be produced based on the print jobs are the same. If the paper sizes are the same (YES in step S744), the processing proceeds to step S745. If the paper sizes are different (NO in step S744), the processing proceeds to step S747.

In step S745, because the two-sided circulation of the image forming apparatus 0101 is controlled based on the paper size and the length of the sheet conveying path, the CPU 0226 determines the print jobs having the same reference image identifier and the same paper size as successive printing targets so that sheets having the same paper size are successively fed.

In step S746, the CPU 0226 determines whether the determination processing is completed for all the print jobs. If the determination processing is completed for all the print jobs (YES in step S746), the processing proceeds to step S742. If the determination processing is not completed for all the print jobs (NO in step S746), the processing returns to step S743.

In step S718 of FIG. 7 according to the present exemplary embodiment, the jobs determined to be the successive printing targets in step S745 are successively transmitted. Furthermore, the jobs determined to be individual transmission targets in step S747 are individually transmitted.

As described above, the inspection apparatus 0108 instructs the client computer 0110 to transmit the print job in consideration of the two-sided circulation of the image forming apparatus 0101, thereby making it possible to perform inspection while increasing the productivity of the image forming apparatus 0101.

According to the above-described exemplary embodiments, even in a system in which information about the reference image identifier and the job cannot be transferred or is not transferred from the print apparatus to the inspection apparatus, the inspection apparatus can receive, from the client computer, the information for identifying the reference image. As a result, the inspection apparatus can perform inspection using an appropriate reference image.

According to the above-described exemplary embodiments, even if information indicating the reference image cannot be added to the printed product, the printed product can be inspected using the reference image corresponding to the printed product.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-104670, filed Jun. 17, 2020, which is hereby incorporated by reference herein in its entirety.

What is claimed is:

1. An inspection system comprising:
    a print apparatus;
    an inspection apparatus configured to inspect quality of a printed product printed by the print apparatus; and
    an information processing apparatus configured to transmit a print job to the print apparatus,
    wherein the inspection apparatus includes:
    a first reception unit configured to receive, from the information processing apparatus, information indicating a reference image,
    an acquisition unit configured to acquire the reference image based on the information indicating the reference image,
    a first transmission unit configured to transmit, to the information processing apparatus, information indicating completion of preparation for inspection, after the receipt of the information indicating the reference image,
    a second reception unit configured to receive, from the print apparatus, a scanned image of the printed product printed by the print apparatus, and
    an inspection unit configured to inspect the quality of the printed product based on a comparison between the received scanned image and the acquired reference image,
    wherein the information processing apparatus transmits the print job to the print apparatus after receiving, from the inspection apparatus, the information indicating the completion of the preparation for the inspection, and
    wherein the print apparatus includes a printing unit configured to perform printing based on the print job received from the information processing apparatus.

2. The inspection system according to claim 1,
    wherein the inspection apparatus further includes a second transmission unit configured to transmit, based on an inspection result obtained in the inspection by the inspection unit, information indicating the inspection result to the print apparatus, and
    wherein the print apparatus further includes a reception unit configured to receive from the inspection apparatus the information indicating the inspection result, and a control unit configured to control a discharge destination of the printed product based on the inspection result obtained in the inspection by the inspection unit.

3. An inspection apparatus configured to inspect quality of a printed product printed by a print apparatus, the inspection apparatus comprising:
    a first reception unit configured to receive information indicating a reference image, from an information processing apparatus configured to transmit a print job to the print apparatus;
    an acquisition unit configured to acquire the reference image based on the information indicating the reference image;
    a first transmission unit configured to transmit, to the information processing apparatus, information indicating completion of preparation for inspection, after the receipt of the information indicating the reference image;
    a second reception unit configured to receive, from the print apparatus, a scanned image of the printed product printed based on the print job received from the information processing apparatus; and
    an inspection unit configured to inspect the quality of the printed product based on a comparison between the received scanned image and the acquired reference image.

4. The inspection apparatus according to claim 3, further comprising a second transmission unit configured to transmit, based on an inspection result obtained in the inspection by the inspection unit, information indicating the inspection result to the print apparatus.

5. A method for controlling an inspection apparatus configured to inspect quality of a printed product printed by a print apparatus, the method comprising:
    receiving information indicating a reference image, from an information processing apparatus configured to transmit a print job to the print apparatus;
    acquiring the reference image based on the information indicating the reference image;
    transmitting, to the information processing apparatus, information indicating completion of preparation for inspection, after receiving the information indicating the reference image;
    receiving, from the print apparatus, a scanned image of the printed product printed based on the print job received from the information processing apparatus; and
    inspecting the quality of the printed product based on a comparison between the received scanned image and the acquired reference image.

6. The method according to claim 5, further comprising transmitting, based on an inspection result obtained in the inspecting, information indicating the inspection result to the print apparatus.

* * * * *